June 25, 1946.  C. H. JUDD  2,402,556
CLOSURE DEVICE
Filed Nov. 22, 1943  2 Sheets-Sheet 1

INVENTOR.
CHARLES H. JUDD
BY
Bates, Teare y McKean
ATTORNEYS

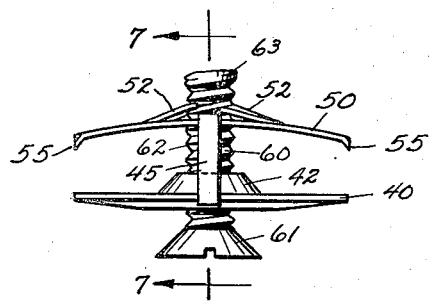
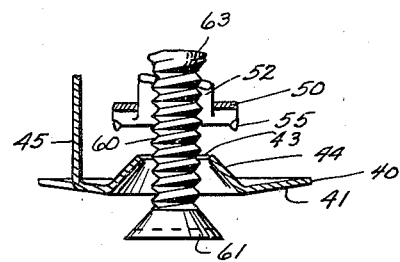
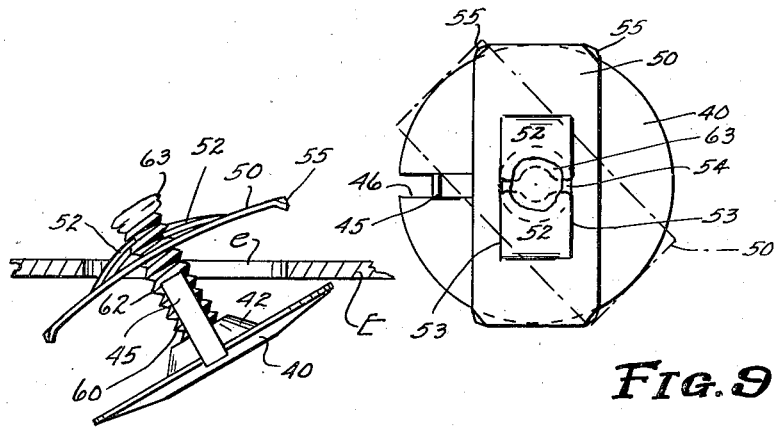
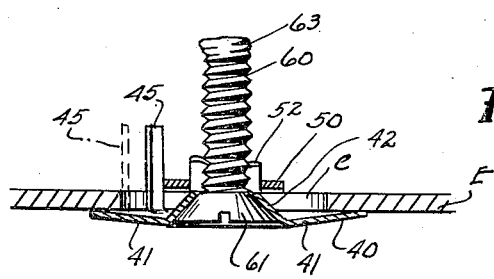

UNITED STATES PATENT OFFICE 2,402,556

CLOSURE DEVICE

Charles H. Judd, Cleveland, Ohio, assignor to Tinnerman Products, Inc., Cleveland, Ohio, a corporation of Ohio Application November 22, 1943, Serial No. 511,223

1 Claim. (Cl. 220—25)

This invention relates to a closure device adapted to be very quickly applied to a structure from the exterior thereof to close an opening therein. More particularly, the invention provides a closure plate for the exterior of the opening, a bridge plate adapted to extend across the opening at the interior and carrying a nut and a threaded bolt passing through the outer plate and threaded into a nut carried by the bridge plate so that when the parts are in place and the bolt is tightened the outer plate is clamped snugly across the opening. A feature of my device is that the bridge member is so formed that it may be readily passed through an opening in the structure and thereafter shifted to bridge the opening.

An object of the invention is to provide such a closure device in a form which may make a substantially flush closure for the opening. Such a flush closure means is especially important in closing external openings in airplanes (either those formed accidentally or those made intentionally to allow access to the interior) and in such cases it is very important that the amount of external projection be reduced to the minimum to enable a substantially flush external surface.

Another object of my invention is to provide very ready means for preventing the nut member of the combination from rotating as the bolt is turned into place.

The drawings illustrate two forms of my invention, first a form wherein the provision for preventing the rotation of the nut is carried by the nut itself, and the second, a form where the rotation preventer is carried by the closure plate, this latter embodiment forming the subject matter of my divisional application No. 530,374, filed April 10, 1944. Each of these forms has the closure plate with a countersunk portion to receive a conical head on the bolt, to provide the desirable substantially flush exterior.

Figure 1:
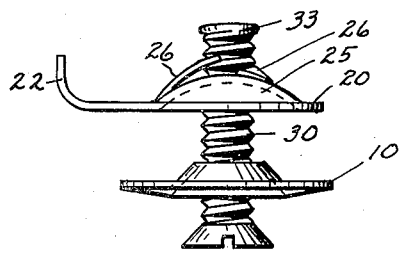
Figure 3:
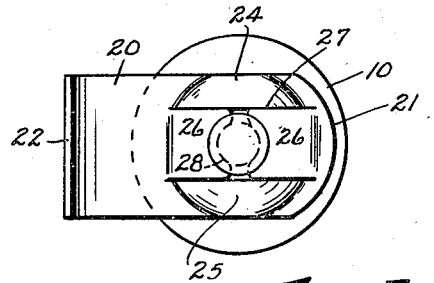
Figure 2:
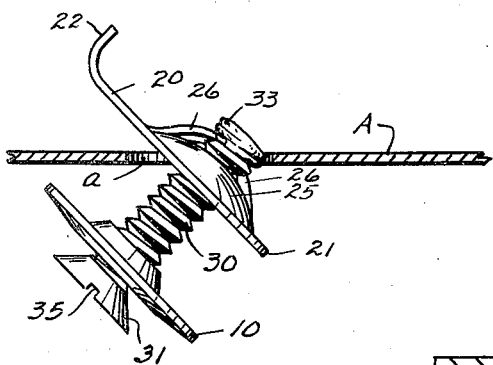
Figure 4:
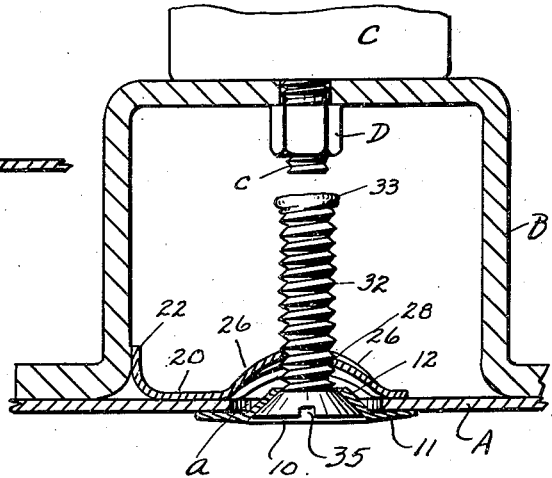
Figure 5:
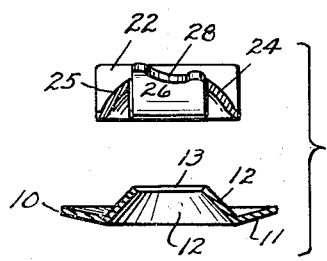

In the drawings, Fig. 1 is a side elevation of the first embodiment of the closure device; Fig. 2 is a similar view of the same device showing it in one of its positions while being passed through the opening in a structural plate, shown in the view; Fig. 3 is a plan of the closure device of Figs. 1 and 2; Fig. 4 is a sectional view showing the device applied to a structure having a normally hidden nut to which access may be obtained by removing the closure; Fig. 5 is a cross section through the closure plate and bridge plate in the position of Fig. 1 with the bolt omitted; Fig. 6 is a side elevation of the second embodiment of my closure device; Fig. 7 is a cross section thereof in a plane at a right angle to Fig. 6, as indicated by the line 7—7 on Fig. 6; Fig. 8 is a side elevation of the device in one of the positions occupied during insertion; Fig. 9 is a plan of this embodiment showing in broken lines the relative position which the bridge plate may assume as the bolt is tightened; Fig. 10 is a sectional elevation of this embodiment tightened in position on a structural plate.

As shown in Figs. 1 to 5 inclusive, the closure device comprises broadly a closure plate 10, a bridge plate 20, and a clamping bolt 30 threaded into the bridge plate.

The closure plate 10 is preferably a circular disc, slightly dished so that its peripheral edge only may contact with the surface of structure that is to be applied. This closure plate is formed with a frusto-conical inward extension 12, the central opening 13 of which is of the proper size for the free passage of the bolt shank.

The bridge plate 20 is of approximately rectangular form, as indicated in Fig. 3, but at one end 21 is rounded and at the other end is curved upwardly, as shown at 22. From the flat portion of the plate 20, I provide a pair of dome segments 24 and 25 and between these segments I form a pair of tongues 26 which are anchored to the body of the bridge plate and incline upwardly beyond the surface of the dome, indicated by the segments.

The tongues 26 are made by a pair of parallel slits 27 across the dome portion of the device connected by a transverse space forming a central bolt opening through such dome portion reaching to the slits. Thus the two tongues are free at their sides and adjacent ends but attached to the body at their extreme ends. The tongues are notched at their free ends, as shown at 28, and warped in opposite directions so that they define one turn of a helical thread.

The bolt 30 is formed with conical head 31 adapted to seat in the countersunk recess 12 of the closure plate and a shank 32 which carries a parallel thread. The inner end of the bolt shank is somewhat upset as shown at 33 to prevent separation of the parts when not in use. The conical head is preferably provided with the screw driver slot 35.

Before application, the fastener plate and bridge plate are separated a suitable distance on the shank to allow the bridge plate to be readily passed through an opening in the structure. Fig. 2 shows, for instance, a structural plate A having an opening a and shows the bridge plate being passed through such opening. The width of the bridge plate is slightly less than the diameter of the opening, and by tipping the device, as indicated in Fig. 2, the major portion of the bridge plate may be passed diagonally through the opening and then by swinging the device in a clockwise direction and shifting it toward the left in Fig. 2, the whole of the bridge plate may be passed through the opening. Then by shifting the device toward the right the rounded end 21 of the bridge plate will come beyond the right hand portion of the opening.

When the parts are positioned the tightening of the bolt brings the frusto-conical portion of the closure plate into the opening and causes the peripheral edge of such plate to engage the outer face of the structural member A. As the bolt is turned-in tight the tongues 26 are sprung inwardly to obtain a very firm strut action against the bolt. At the same time the dished outer disc may be somewhat flattened. Thus when the parts are in their final position, the closure plate extends only slightly beyond the surface of the supporting plate A and leaves a substantially flush exterior.

In various structures, especially in airplane work, there are restricted spaces back of a facing plate to which it is desired to secure access from the exterior by the removal of a closure across an opening in such face plate. Such construction is illustrated in Fig. 4, where B is a cross section of a channel beam flanged at its edges and having the face plate A attached to it. In this figure, I have indicated some member C secured to the outer face of the channel web by a nut D screwing onto a threaded stud c projecting from the member C through the web of the channel. The opening a of the face plate A allows access to the nut for its tightening or loosening by a socket wrench. My device provides a ready closure for such opening.

When the closure is in position, as indicated in Fig. 4, the upturned end 22 lies in contact with an inner surface of the structural portion B and prevents rotation of the bridge member. Accordingly, when the device is put in place from the exterior through the opening a, the screw may be turned tightly into position by the mere application of a screw driver to the slot 35.

The embodiment of Figs. 6 to 10 also has the closure plate with the frusto-conical portion, the bridge plate with the raised warped tongues, and the bolt with the conical head. In this case, however, the rotation preventer for the nut comprises a tongue formed on the closure plate and projecting inwardly therefrom so that they may be engaged by the bridge plate.

Referring to the parts of the second embodiment by reference numerals, 40 indicates the closure plate, 50 the bridge plate and 60 the bolt. The closure plate 40 is somewhat dished, as shown at 41, and has the frusto-conical portion 42 terminating in the opening 43. This closure plate is provided with a tongue 45 which is cut from the body of the plate, and from material beyond the finished periphery of the plate, by a radial notch 46, and then turned upwardly at approximately right angle to the general plane of the closure plate.

The bridge plate 50 is a parallel-sided member; that is, it is of approximately substantially rectangular form. This bridge plate is provided with a pair of tongues 52 partially severed from the body of the plate by parallel slits 53 and a transverse central opening 54, the tongues being then bent up at oblique angles. The tongues are notched at their ends and are warped in opposite directions so that their ends define a helical turn for the bolt. Preferably, the corners of the bridge plate 50 are bent down, as shown at 55, to provide anchorage prongs to engage the structure against which the parts are clamped.

The bolt is the same as in the first embodiment having a conical head 61, a shank with parallel threads 62, and an upset end 63.

E in Fig. 10 indicates a suitable structural plate having an opening e through which the bridge plate of my device may be passed. In mounting the device it is tipped somewhat, as indicated in Fig. 8 and bridge plate passed through the opening e, after which the device is shifted slightly to cause both end portions of the bridge plate to extend beyond the opening and to bring the tongue 45 of the closure plate into position against the periphery of the opening. Then the screw is tightened, bringing the parts into the position shown in Fig. 10.

In the rotation of the screw 60, the nut member will naturally tend to rotate with the screw, but in such rotation its edge impinges against the tongue 45, which prevents further rotation. Then the bridge plate descends along the tongue as the screw is rotated and finally comes into the position shown in Fig. 10. In this position the prongs 55 in the corners of the bridge plate become imbedded in the member E to anchor the entire device to the supporting structure.

The closure device of this second embodiment is well adapted, for instance, for patching openings made in airplane walls, as, for instance, by passage of a bullet. To effect the repair it is only necessary to ream out the opening sufficiently for the passage of the bridge plate and then to insert the device and tighten it.

I claim:

A device for closing an opening in a plate while mounted on a structural member, said structural member being on the inner side of the plate and having a portion projecting therefrom at one side of the opening, comprising a closure plate adapted to cover the opening on the outer side thereof, a bridge plate having an intermediate region deformed about an opening therethrough to provide a thread-engager, and a threaded bolt passing through the closure plate and the bridge plate and threadingly occupying said thread engager, said bridge plate being narrower than the closure plate and having an extension at one side only, which extension carries a projection at an angle thereto adapted to engage a face of said projecting portion of the structural member and prevent rotation of the bridge plate.

CHARLES H. JUDD.